May 22, 1956 K. WEIGEL ET AL 2,747,102
DIAGNOSTIC X-RAY TESTING APPARATUS
Filed Nov. 13, 1952 4 Sheets-Sheet 1

INVENTORS
Kurt Weigel
Hansheinrich Verse
BY Fred M Vogel
AGENT

May 22, 1956     K. WEIGEL ET AL     2,747,102

DIAGNOSTIC X-RAY TESTING APPARATUS

Filed Nov. 13, 1952     4 Sheets-Sheet 2

INVENTORS
Kurt Weigel
Hansheinrich Verse
BY Fred M Vogel
AGENT

INVENTORS
Kurt Weigel
Hansheinrich Verse
BY
Fred M Vogel
AGENT

INVENTORS
Kurt Weigel
Hansheinrich Verse
BY
*Fred M Vogel*
AGENT

United States Patent Office 2,747,102
Patented May 22, 1956

2,747,102
DIAGNOSTIC X-RAY TESTING APPARATUS

Kurt Weigel and Hansheinrich Verse, Hamburg-Fuhlsbuttel, Germany, assignors to Hartford National Bank and Trust Company, Hartford, Conn., as trustee Application November 13, 1952, Serial No. 320,174

Claims priority, application Germany December 20, 1951

6 Claims. (Cl. 250—50)

This invention relates to diagnostic X-ray apparatus, and constitutes an improvement in the apparatus described in our copending U. S. patent application, Serial No. 316,372, filed October 23, 1952.

With most diagnostic X-ray apparatus, the patient remains fixed during the examination, and the X-ray tube or radiation source is moved jointly with the image receiver. When using the apparatus described in the aforementioned patent application, just the reverse is the case. In accordance with that patent application, a support for the patient is secured to a cross-support so as to be movable in a plane in two directions at right angles to each other. That application does not make provision for the possibility of tilting the plane, which is determined by said directions at right angles to each other, relatively to the cone of rays. However, it will sometimes be desirable to give the cone of rays the optimum direction for observation, prior to starting the examination proper.

In accordance with the invention, not only the support but also the cone of rays and the image receiver are movable in order to permit them of moving jointly about a fixed spatial point situated on the axis of the cone of rays, during which movement said axis passes invariably through one and the same point of the projection plane of the image receiver. On account of the limited size of the cone of rays and of the projection plane a translation alone of the X-ray tube is not sufficient.

The fixed point may be chosen at will. It may preferably be situated in the eyepiece of a luminoscope acting as an image receiver. This has the advantage that the point of observation does not change in accordance with the setting of the cone of rays.

In order that the invention may be readily carried into effect, it will now be described with reference to the accompanying drawings representing, by way of example, one form of the apparatus according to the invention, in which the support for a patient is movable about an axis extending in its direction of length i. e. one of the directions in which the support is movable. When moving the support in the other directions, said axis describes a plane, hereinafter termed the plane of displacement. In the example described hereinafter, the fixed point lies in said plane. If the support occupies its mid-position, the fixed point is situated on the axis about which the support is adapted to rotate. If the X-ray tube occupies its mid-position, the axis of the cone of rays extends at right angles to the plane of displacement.

Figure 1:
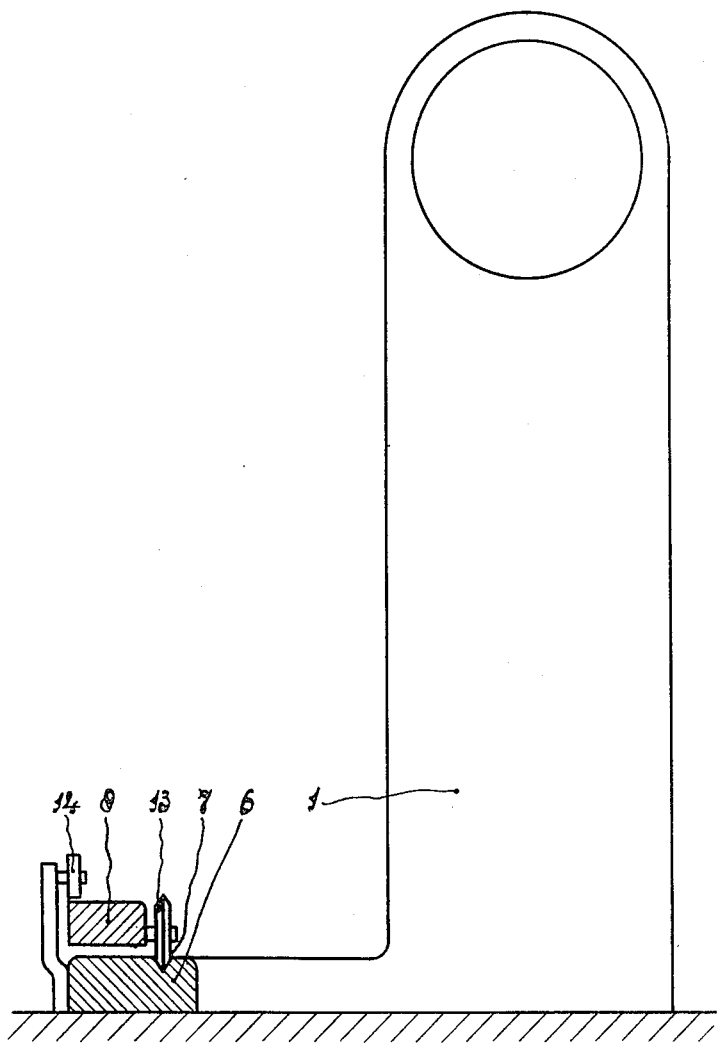
Figs. 1, 2 and 3 show the parts of the apparatus intended for setting the axis of the cone of rays in a horizontal direction, in Figs. 1 and 3 viewed in the direction at right angles to the plane of displacement and in Fig. 2 viewed from above.
Figure 2:
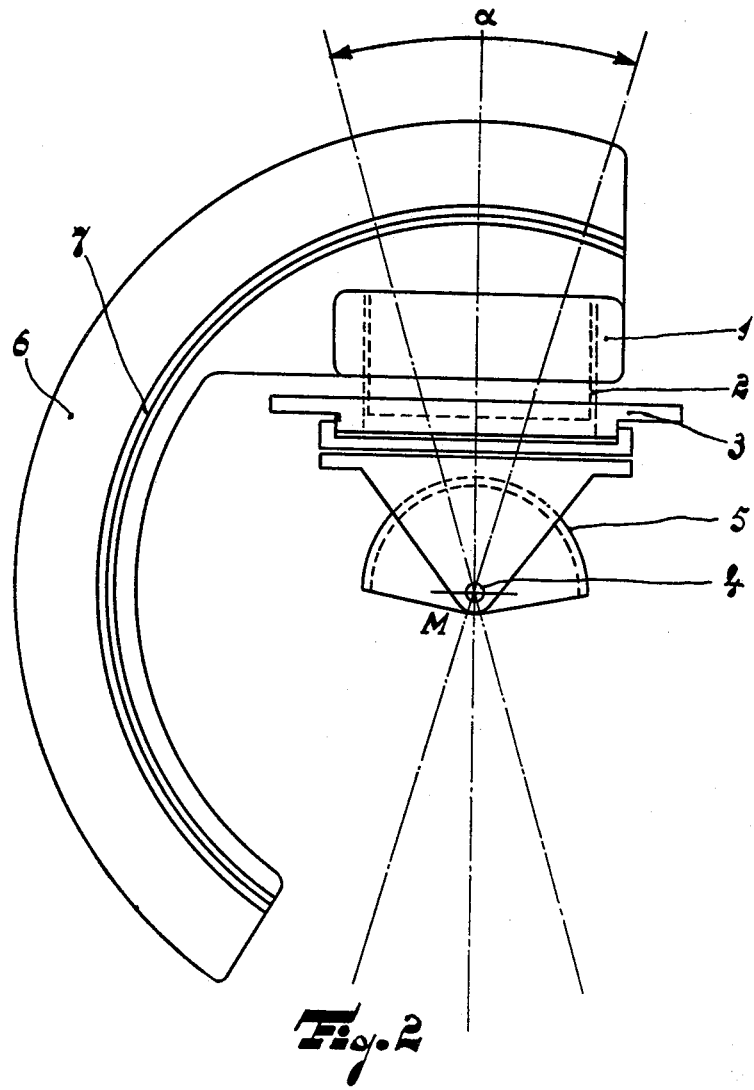
Figure 3:
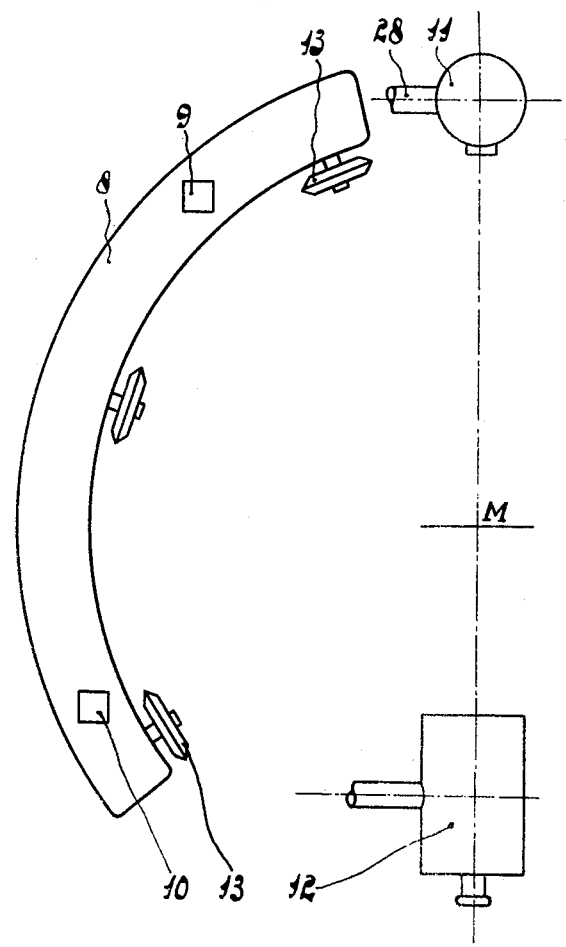
Figure 4:
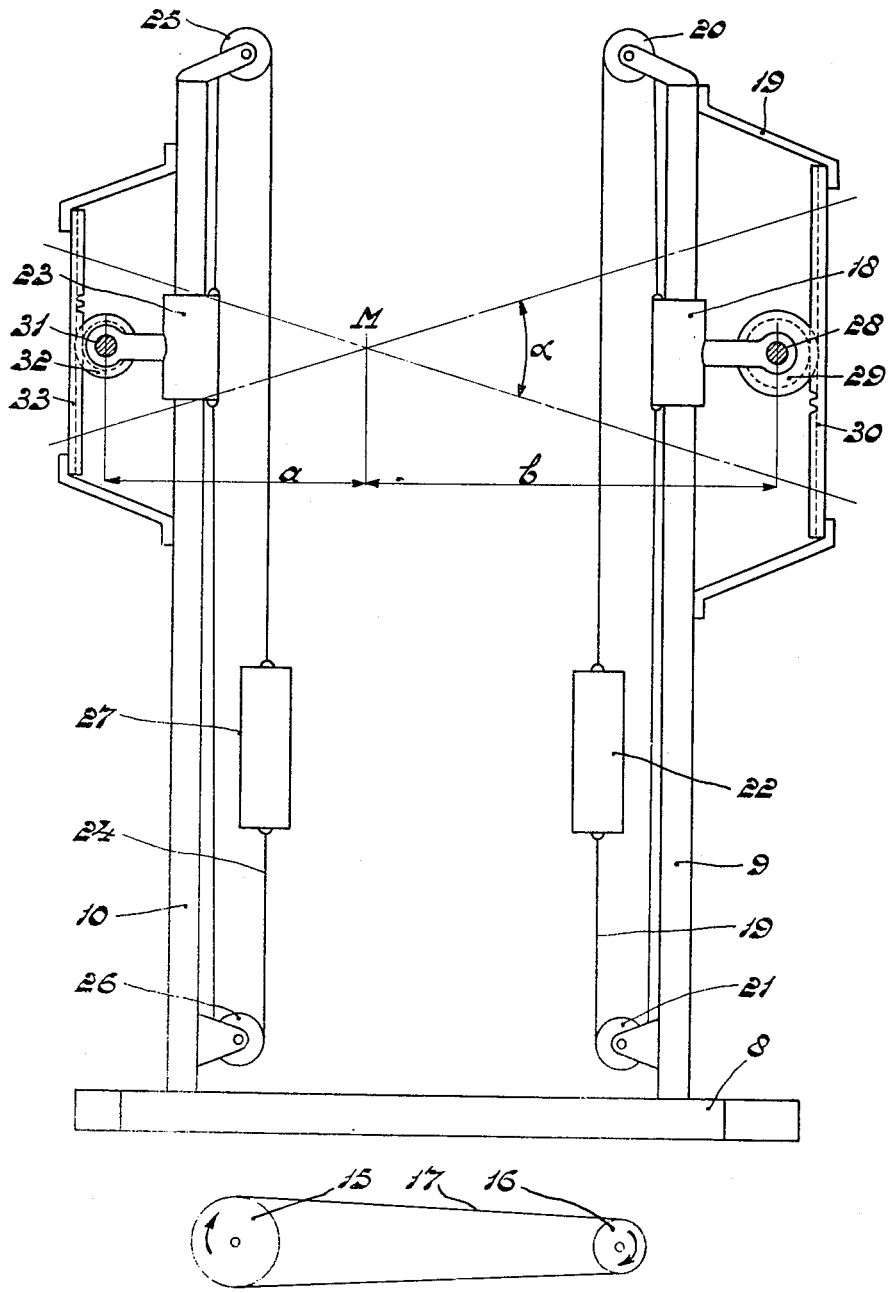
Fig. 4 shows an example of a device which permits the axis of the cone of rays to be set in a vertical direction.

In Figs. 2, 3 and 4 the fixed point is designated M, the angle through which the axis of the cone of rays is movable about the point M being designated $\alpha$ in Figs. 2 and 4.

On a base 1 rests a hollow shaft 2 whose inner diameter is such as to permit the X-rays to pass unimpeded if the axis of the cone of rays coincides with a generatrix of the cone having the apex $\alpha$.

Said shaft has secured to it a cross-support 3 carrying the rotary support 5 for the patient, which support is adapted to rotate about a shaft 4. The base 1 has an extension 6 which is furnished with a slot 7. This slot constitutes a circular guide which is located in a horizontal plane and whose centre is the point at which the projection of the axis of the cone of rays on the plane of the guide intersects the plane of displacement. The system comprising the X-ray tube and the image receiver is movable over said guide in order to cause the said parts to describe a circular path about the point M.

To this end use is made of a carriage 8 of curved shape adapted to move over the guide. Said carriage carries columns 9 and 10 from which the X-ray tube 11 and the image receiver (luminoscope) 12 are suspended. The assembly rests on wheels 13, which are guided through the slot 7, and is retained, in order to prevent tilting, by guide rollers 14 fitted to the base 1 and engaging around the edge of the carriage.

Adjustment of the axis of the cone of rays in a vertical direction is possible, since the X-ray tube and the luminoscope are movable upwardly and downwardly along the columns 9 and 10. By means of a coupling provision is made that the movements of both of them depend upon each other. This coupling is diagrammatically shown in Fig. 4 as an assembly of wheels 15 and 16 over which passes a rope 17. The X-ray tube is fitted to a guide bushing 18 which is adapted to move along the column 9 and connected to a counter-poise 22 through a chain 19 passing over wheels 20 and 21. The image receiver is fitted to a guide bushing 23 which is adapted to slide along the column 10 and is connected to a counter-poise 27 through a chain 24 passing over wheels 25 and 26. The wheels 21 and 26 have the same diameter and are rigidly secured to the wheels 16 and 15 respectively. The latter have different diameters related as the distances $a$ and $b$ of the fixed point M from the projection plane and the source of radiation respectively. In this manner it is secured that also in the case of displacement in a vertical direction the axis of the cone of rays is invariably directed to the same point of the projection screen.

To this end, however, it is necessary for the applicator to follow said movement and to perform a rotation about the source of radiation. Hence, the tube is secured to an arm 28 which is turned about its axis upon displacement of the guide bushing 18 along the column 9. This may be effected by means of a gear wheel and rack construction. In the drawing, for the sake of simplicity, a gear wheel 29 fitted to the arm 28 meshes with a rack 30 secured to the column. In order to avoid the use of a bulky gear wheel recourse will, in practice, be had to a suitable transmission between the rotary arm 28 and the gear wheel meshing with the rack.

Since a fluorescent screen and particularly an image amplifier should not be exceedingly inclined relatively to the axis of the cone of rays, the image receiver should also be tilted during its displacement along the supporting column. In order to illustrate that this is indeed true in the apparatus as represented a corresponding construction as present with the X-ray tube is also shown secured to the guide bushing 23 to which the image receiver is fitted. In this instance, the rotary arm is denoted by 31, the gear wheel by 32 and the rack by 33. In this case, also, provision must be made for a suitable transmission of motion to the effect that the axis of the image receiver passes invariably through the point M.

Intercoupling of the movements of the X-ray tube and the projection screen such that the axis of the cone of rays passes through a fixed point in space and, moreover, through the same point of the screen, has come to be known for other purposes inter alia for taking tomographic images. For said coupling use is mostly made of an arm to which the X-ray tube and the image receiver are secured, said arm then being swingable about an axis extending through the fixed point. Such a direct coupling may also be used for the apparatus according to the invention, but the aforesaid coupling has the advantage over the direct coupling that it is more easy to permit free rotation of the support about the axis of the hollow shaft.

What we claim is:

1. An apparatus for carrying out medical X-ray examination of a patient, comprising a support for the patient, means secured to the support for effecting movement thereof in a plane of displacement in two directions at right angles to each other, a radiation source disposed on one side of said support for producing a cone of X-rays having a given axis, an image receiver disposed on the other side of said support and having a projection plane for receiving the X-ray image of the patient, said axis of said cone of X-rays passing through a given point of said projection plane and a fixed point in space, and means coupled to both said radiation source and said image receiver for jointly moving the same in opposite directions to positions in which the axis of the cone of X-rays always passes through both said given point of said projection plane and said fixed point in space.

2. An apparatus as claimed in claim 1 in which the image receiver contains an eyepiece and the fixed point in space is located in the eyepiece.

3. An apparatus as claimed in claim 1 in which the support is rotatable about an axis extending in the direction of its length and located in said plane of displacement, and said fixed point in space is located in said plane of displacement.

4. An apparatus for carrying out medical X-ray examination of a patient, comprising a base member having a circular guide portion extending in a horizontal plane, a support for the patient mounted on said base, means secured to the support for effecting movement thereof in a vertical plane of displacement in two directions at right angles to each other, said support being rotatable about an axis extending in the direction of its length and located in said vertical plane, the center of said circular guide lying on said axis, an X-ray tube for producing a cone of X-rays having a central axis disposed on one side of said patient support, an image receiver having a projection plane for receiving an X-ray image disposed on the other side of said support, said axis of said cone of X-rays passing through a given point of said projection plane and through a fixed point located in said vertical plane of displacement, a movable supporting system mounted on the circular guide portion of said base and moveable thereover in a circular path, said supporting system including a pair of vertical columns supporting, respectively, said X-ray tube and said image receiver, and means for moving said supporting system in said circular path to positions in which the axis of the cone of X-rays always passes through both said given point of said projection plane and said fixed point.

5. An apparatus as claimed in claim 4 in which means are provided for jointly moving the X-ray tube and image receiver in opposite vertical directions along their respective supporting columns to positions in which the axis of the cone of X-rays always passes through both said given point and said fixed point.

6. An apparatus as claimed in claim 5 in which means are provided coupled to the vertically moving means for rotating the X-ray tube and image receiver about a horizontal axis while they are being vertically displaced such that they face each other in all positions, said last-named means including a gear wheel and rack construction.

References Cited in the file of this patent

UNITED STATES PATENTS

| | | |
|---|---|---|
| 1,599,696 | Wantz | Sept. 14, 1926 |
| 1,985,715 | Bucky | Dec. 25, 1934 |
| 2,000,497 | Pohl | May 7, 1935 |
| 2,392,324 | Vladeff | Aug. 18, 1942 |
| 2,511,097 | Bonnet | June 13, 1950 |
| 2,523,132 | Mason et al. | Sept. 19, 1950 |
| 2,558,539 | Chausse | June 26, 1951 |
| 2,571,011 | Chapman | Oct. 9, 1951 |
| 2,646,514 | Noschis | July 21, 1953 |